United States Patent
Greco

[15] 3,679,753
[45] July 25, 1972

[54] PREPARATION OF DIHYDROCATECHOL FROM CYCLOHEXANONE

[72] Inventor: Nicholas P. Greco, Pittsburgh, Pa.

[73] Assignee: Koppers Company, Inc.

[22] Filed: Feb. 11, 1969

[21] Appl. No.: 798,467

[52] U.S. Cl. ............................................ 260/586 B, 23/209
[51] Int. Cl. .......................................................... C07c 45/00
[58] Field of Search ...................................260/586 B, 586 R

[56] References Cited

UNITED STATES PATENTS 3,153,066  10/1964  Werber ............................... 260/586 R

OTHER PUBLICATIONS

De Borger et al., " Bull. Soc. Chim. Belg." Vol. 73 pp. 73–80 (1964).
Metze et al., " Berichte" Vol. 89, pp. 2470–1. (1956).

Primary Examiner—Leon Zitver
Assistant Examiner—Norman Morgenstern
Attorney—William G. Kratz, Jr. and Olin E. Williams

[57] ABSTRACT

Dihydrocatechol is prepared from cyclohexanone by oxidation in the presence of aqueous selenium dioxide at a temperature of 15°–25°C. The red selenium produced by the reduction of a selenium dioxide is converted to an easily separable form of black selenium powder by removing excess water from the mixture, adding black selenium to the product mixture and heating. The black selenium is easily separated by filtration and the dihydrocatechol recovered from this product mixture.

8 Claims, No Drawings

PREPARATION OF DIHYDROCATECHOL FROM CYCLOHEXANONE

BACKGROUND OF THE INVENTION

The use of selenium dioxide as an oxidizing agent for carbonyl compounds has become well known in the art, since first being reported by Riley, J. Chem. Soc. 1875 (1932). However, the use of this oxidizing agent in the preparation of dihydrocatechol has been undesirable because of the low yield of product and the expensive preparation of by-products. For example, the use of selenium dioxide by Riley, in the presence of ethanol as solvent, resulted in only a 35 percent yield of dihydrocatechol.

It has now been found that selenium dioxide can be used as an oxidizing agent in the preparation of excellent yields of dihydrocatechol from cyclohexanone, in easily recoverable form, provided that the oxidation is carried out in the absence of a solvent, and excess water that is not soluble in the residual cyclohexanone is removed from the reaction mixture prior to the removal of selenium from the spent reaction mixture.

SUMMARY OF THE INVENTION

In accordance with the present invention, dihydrocatechol is prepared from cyclohexanone by maintaining an agitated reaction mixture of cyclohexanone and selenium dioxide, the selenium dioxide being present as a 40–70 percent by weight aqueous solution, the cyclohexanone being present in a mole ratio of 4–7 moles per mole of selenium dioxide, at a temperature of 15–25° C. for a period of time sufficient to convert cyclohexanone to dihydrocatechol. During or immediately following the formation of the dihydrocatechol, water is removed, preferably under reduced pressure so as to form a product mixture having no more water than is soluble in the remaining cyclohexanone, followed by addition of black selenium powder and heating, removal of the total selenium from the reaction mixture and recovery of the dihydrocatechol.

DETAILED DESCRIPTION

Cyclohexanone and selenium dioxide, as an aqueous solution, are the only reactants needed in the oxidation of dihydrocatechol according to the present process. Selenium dioxide, of course, when present as an aqueous solution, combines with water to form selenious acid, $H_2SeO_3$.

The oxidation reaction is illustrated generally by the following equation:

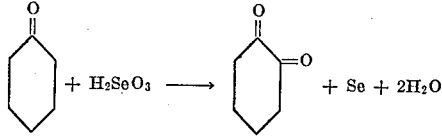

The dihydrocatechol exists as a mixture of enolizable isomers of the following structures, with the 2-hydroxy-2-cyclohexene-1-one as the predominant isomer at room temperature:

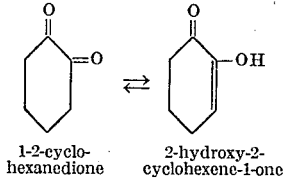

1-2-cyclo-        2-hydroxy-2-
hexanedione       cyclohexene-1-one

For the purpose of simplicity and calculation of mole ratios and the like, the selenious acid will be characterized herein as an aqueous selenium dioxide solution.

The selenium dioxide should be present in the form of a 40–70 percent by weight aqueous solution. This percentage permits ready handling of the selenium dioxide and provides for adequate contact, when the aqueous selenium dioxide is contacted, with agitation, with cyclohexanone. Preferably, about a 50 percent aqueous solution of selenium dioxide is used, giving adequate dispersion and a reasonable amount of water, which, according to the present precess is removed following the contact period.

The cyclohexanone, to be oxidized according to my process, is present in a mole ratio of about 4–7 moles per mole of selenium dioxide present in the reaction mixture. Less that about 4 moles significantly increases reaction time with resultant problems of byproduct formation, while in excess of about 7 moles of cyclohexanone gives no observable benefits and requires additional handling and product separation problems.

The cyclohexanone is contacted with aqueous selenium dioxide, and the reaction mixture agitated. Preferably, the aqueous selenium dioxide is added to the desired amount of agitated cyclohexanone over a period of time. The time of addition can vary and is dependent upon the ability to remove the exotherm of reaction from the reaction mixture. With sufficient cooling, the aqueous selenium dioxide could be added as a single batch.

The temperature of the reaction mixture and maintenance of the temperature at about 15–25°C. during the reaction is an important aspect of the present invention. Thus, adequate cooling needs to be provided to maintain the desired temperature. Temperatures above about 25°C. cause a significant problem in the production of byproducts, especially such products as cyclohexene-2-one, because the reaction mechanism does not follow the desired selective oxidation. Lower temperatures than about 15° C., of course, require excessive cooling and provide no appreciable benefit. Atmospheric pressure is advantageously used in the present process although reduced pressure may be used if water is removed during the oxidation or increased pressures if water is to be removed following the oxidation period. Preferably, a blanket of inert gas such as nitrogen is provided over the reaction mixture.

The course of the reaction is readily followed merely by visual observation of the reaction mixture. The mixture is agitated at the desired temperature for a period of time until the reaction mixture achieves the reddish color of elemental selenium. The red elemental selenium casts a reddish color throughout the mixture and indicates that the selenium dioxide has been, by reaction with the cyclohexanone, reduced to elemental selenium. The time for reaction, including that of adding the aqueous solution of selenium dioxide, may be as much as a 12-hour period, but generally times much in excess of this are unnecessary.

During the oxidation reaction, the selenium dioxide is converted to elemental red selenium in an amorphous (almost collodial) form which poses serious separation difficulties because of the danger of forming a lump or conglomerate when converting the red elemental selenium to black, crystalline, powdered selenium, the desired, stable and easily handled form. To provide efficient conversion to black selenium powder, the water present in the reaction mixture (that added in the aqueous selenium dioxide solution and water of reaction) must be removed to an extent that only as much residual water remains as is soluble in the remaining excess cyclohexanone of the reaction mixture. In order to remove the water, sub-atmospheric pressures are used so that the reaction mixture is not excessively heated during the removal. An especially efficient method of water removal is to employ vacuum distillation during the time the reaction is being carried out so as to provide evaporative cooling as an aid to removal of the heat of exotherm. If desired, however, the removal of the water can be postponed until the reaction is complete and then carried out under reduced pressure. The water is removed until a homogeneous liquid phase is present, thus indicating that any water that does remain is dissolved in the excess cyclohexanone. The solubility of water in cyclohexanone is such that a cyclohexanone solution containing about 9 percent water will be saturated, thus the amount of water present for homogeniety should be below this amount.

Upon achieving a homogeneous liquid phase, the reaction mixture contains excess cyclohexanone, dihydrocatechol, residual water dissolved in cyclohexanone, and elemental red selenium. At this state, the removal of the selenium is facilitated by converting it into a black granular or powdered form. The reaction mixture, with agitation, has added thereto a small amount of black powdered selenium, and the mixture heated to convert the elemental red selenium to its black powdered form. The amount of black selenium added to the reaction mixture can vary, with preferably about one-quarter mole being added per mole of selenium theoretically present in the reaction mixture upon reduction of the selenium dioxide to elemental selenium. The amount of black selenium added can vary over a wide range, generally between 0.15–0.35 mole per mole of elemental selenium (Se). After addition of the black selenium, the reaction mixture is heated, to a temperature below about 100°C., preferably about 80°C., and stirred until the mixture looses its reddish cast and the elemental red selenium is converted to its black or gray powdered form. Heating and stirring for about 1–2 hours generally results in conversion of the red selenium and provides a readily filterable reaction product mixture. The black selenium is then removed from the cyclohexanone, and dihydrocatechol and water solution by mechanical means, e.g., by filtration, centrifugation or the like. Such separation is easily achieved because the selenium is present in a black powdered form. After removal of this black selenium powder, the product mixture is flash or fractionally distilled to separate the dihydrocatechol from excess cyclohexanone and residual water.

The invention is further illustrated by the following examples wherein parts are parts by weight unless otherwise specified.

EXAMPLE I

To a reactor, there was charged 630 ml. of cyclohexanone (6 moles) and the charge covered with a nitrogen atmosphere. The charge was held at 20°C. while 56 percent aqueous selenious acid solution (142 ml., 1.02 mole) was added dropwise over a period of about 3 hours. The mixture was stirred for an additional 9-hour period and left to stand overnight without agitation. After standing, 132 ml. of water was distilled off from the reaction mixture at a temperature of 20°–25°C. under a vacuum of 15 mm. mercury pressure. There was then added to the agitated mixture, 25 grams of powdered black selenium and the charge was heated to 80°–83°C. and held at this temperature range for 1.5 hours. The mixture was filtered at room temperature and the gray selenium washed with hot cyclohexanone (250 ml. portions). The recovered selenium (85 grams) was 75 percent of the theory. The filtrate, 673 grams, was analyzed by vapor phase chromatographic analysis and showed 16.1 percent dihydrocatechol. An aliquot of the filtrate (323.5 grams) was flashed distilled at 160°–170°C./16mm. to yield 302 grams of distillate containing 17.9 percent dihydrocatechol by analysis. The residue, by extraction with cyclohexanone, was found to contain 10.1 grams of selenium and 8.0 grams of an organic material. The flash distillate was fractionally distilled to give 59.6 grams of crude dihydrocatechol (91.7 percent pure), corresponding to an actual yield of 100 percent based on selenious acid.

EXAMPLE II

To a 3-neck, 1-liter flask provided with dropping funnel, agitator, and a Dean-Stark trap under a water cooled condensor, there was charged 630 ml. (6.0 moles) cyclohexanone. The stirred reactor was evacuated to 17 mm. pressure. Selenious acid (215 grams of 47 percent aqueous solution, 0.93 moles) was added to the stirred charge over a period of 5 1/2 hours. Water collected in the trap was removed during the reaction and cyclohexanone returned to the reactor. The reaction temperature was maintained at 25°C. by an oil bath at 46°C., to offset excessive evaporative cooling.

Water (130 ml.), collected during the reaction, was close to the theoretical amount (139 ml.) Black selenium powder (24.8 grams) was then added to the reaction pot and the charge heated to 80°C. and held at this temperature for 1 hour to convert the red selenium formed during the oxidation step to black selenium. The oxidation mixture was filtered easily to give powdered selenium (88 grams). The filtrate which contained a yield of dihydrocatechol of 90.1 percent, was flashed distilled at 140°–180°C./16 mm. The residue (19.6 grams) from the flash distillation was dissolved in aqueous sodium carbonate solution and filtered to give 11 grams of selenium. Fraction distillation of the flash distillate gave 92.7 grams (89 percent yield) of pure dihydrocatechol boiling point 74°–76°C./16 mm.

EXAMPLE III

To show the effect of temperature on the reaction, an oxidation was carried out according to Example II, using a mole ratio of 6.0 cyclohexanone to selenium dioxide at a reaction temperature of 80°C. The product contained only 30 percent dihydrocatechol and a 62 percent yield of a byproduct, cyclohexene-2-one.

EXAMPLE IV

To a 10-gallon kettle with an agitator, there was charged 58.8 pounds of cyclohexanone. To the stirred cyclohexanone, there was added over a 3-hour period 22.35 pounds of selenium acid $H_2SeO_3$ (50 percent aqueous solution). The mole ratio of cyclohexanone to selenium dioxide was 6:1. The temperature of the mixture during the addition was maintained at 19.9°–21°C. and the pressure at atmospheric. After 27 hours, of additional stirring at 18.7°–23°C. atmospheric pressure, the mixture had charged thereto 900 grams of powdered black selenium and the temperature was raised to 82°C. with stirring, during 0.5 hour. After an additional 0.5 hour at 80°C., the mixture was diluted by adding 35 pounds of cyclohexanone and filtered. The filtrate contained a 98.2 percent yield of dihydrocatechol based on selenium dioxide.

What is claimed is:

1. A process for preparing dihydrocatechol from cyclohexanone comprising:
  a. forming a reaction mixture of cyclohexanone and a 40–70 percent aqueous solution of selenium dioxide, in a mole ratio of 4–7 moles of cyclohexanone per mole of selenium dioxide;
  b. maintaining said reaction mixture at a temperature of 15°–25C., with agitation, for a period of time sufficient to convert cyclohexanone to dihydrocatechol and form water of reaction while converting selenium dioxide to red selenium metal;
  c. removing water from said reaction mixture at sub-atmospheric pressure so as to provide only so much residual water in said mixture as is soluble in the cyclohexanone present in said mixture;
  d. adding black selenium powder to said mixture and heating said mixture to a temperature below about 100°C. to convert said red selenium metal to further black selenium powder;
  e. removing said black selenium powder from said mixture by mechanical means; and
  f. recovering said dihydrocatechol.

2. The process of claim 1 wherein said aqueous solution contains 50 percent by weight of selenium dioxide.

3. The process of claim 1 wherein said cyclohexanone in said reaction mixture is present in a mole ratio of 6 moles per mole of selenium dioxide.

4. The process of claim 1 wherein said water is removed at sub-atmospheric pressure during said conversion of cyclohexanone to dihydrocatechol.

5. The process of claim 1 wherein said water is removed at sub-atmospheric pressure following substantial conversion of cyclohexanone to dihydrocatechol.

6. The process of claim 1 wherein said black selenium powder is added in an amount of about 0.15–0.35 mole per mole of red selenium metal present in said mixture.

7. The process of claim 1 wherein following said addition of black selenium powder, said mixture is heated to about 80°C. to convert said red selenium metal to further black selenium metal.

8. A process for preparing dihydrocatechol from cyclohexanone comprising:
   a. forming a reaction mixture of cyclohexanone and a 40–70 percent aqueous solution of selenium dioxide, in a mole ratio of 6 moles of cyclohexanone per mole of selenium dioxide;
   b. maintaining said reaction mixture at a temperature of 15°–25C. with agitation, for a period of time to convert cyclohexanone to dihydrocatechol and form water of reaction while converting selenium dioxide to elemental selenium metal;
   c. removing water from said reaction mixture at sub-atmospheric pressure to provide a homogeneous liquid phase in said reaction mixture;
   d. adding 0.15–0.35 moles of black selenium powder per mole of elemental selenium in said mixture to said mixture and heating said mixture to a temperature below 100°C. to convert said elemental selenium to further black selenium powder;
   e. removing said black selenium powder from said mixture by mechanical means; and
   f. recovering said dihydrocatechol.

* * * * *